June 13, 1961 R. D. RUMSEY 2,988,056

LINEAR TYPE SHIMMY AND STEER DAMPER

Filed Dec. 20, 1956 10 Sheets-Sheet 1

INVENTOR.
ROLLIN DOUGLAS RUMSEY
BY
Hill, Sherman, Meroni, Gross & Simpson
ATTORNEYS June 13, 1961 R. D. RUMSEY 2,988,056

LINEAR TYPE SHIMMY AND STEER DAMPER

Filed Dec. 20, 1956 10 Sheets-Sheet 2

INVENTOR.
ROLLIN DOUGLAS RUMSEY
BY
Hill, Sherman, Meroni, Gross & Simpson
ATTORNEYS INVENTOR.
ROLLIN DOUGLAS RUMSEY
BY
Hill, Sherman, Meroni, Gross & Simpson
ATTORNEYS INVENTOR.
ROLLIN DOUGLAS RUMSEY
BY
Hill, Sherman, Meroni, Gross & Simpson
ATTORNEYS June 13, 1961 R. D. RUMSEY 2,988,056

LINEAR TYPE SHIMMY AND STEER DAMPER

Filed Dec. 20, 1956 10 Sheets-Sheet 5

INVENTOR.
ROLLIN DOUGLAS RUMSEY

BY

Hill, Sherman, Meroni, Gross & Simpson
ATTORNEYS

LINEAR TYPE SHIMMY AND STEER DAMPER

Filed Dec. 20, 1956

INVENTOR.
ROLLIN DOUGLAS RUMSEY

BY

Hill, Sherman, Meroni, Gross + Simpson
ATTORNEYS

June 13, 1961 R. D. RUMSEY 2,988,056

LINEAR TYPE SHIMMY AND STEER DAMPER

Filed Dec. 20, 1956 10 Sheets-Sheet 7

Inventor
Rollin D. Rumsey by Hill, Sherman, Meroni, Gross & Simpson Attys.

LINEAR TYPE SHIMMY AND STEER DAMPER

Filed Dec. 20, 1956 10 Sheets-Sheet 8

Inventor
Rollin D. Rumsey by Hill, Sherman, Meroni, Gross & Simpson Attys.

LINEAR TYPE SHIMMY AND STEER DAMPER

Filed Dec. 20, 1956

Inventor
Rollin D. Rumsey
by Hill, Sherman, Meroni, Gross & Simpson Attys.

June 13, 1961 R. D. RUMSEY 2,988,056

LINEAR TYPE SHIMMY AND STEER DAMPER

Filed Dec. 20, 1956 10 Sheets-Sheet 10

Inventor
ROLLIN D. RUMSEY by Hill, Sherman, Meroni, Gross & Simpson Attys.

United States Patent Office 2,988,056

Patented June 13, 1961

2,988,056

LINEAR TYPE SHIMMY AND STEER DAMPER

Rollin Douglas Rumsey, Buffalo, N.Y., assignor to Houdaille Industries, Inc., Buffalo, N.Y., a corporation of Michigan Filed Dec. 20, 1956, Ser. No. 629,559
5 Claims. (Cl. 121—38)

This invention relates to a rotary shaft control means and particularly to a steering and shimmy dampening mechanism adapted for the steering wheels of aircraft and the like.

It is an important object of the present invention to provide a rotary shaft control means providing extreme rigidity between the shaft and the actuator for the control.

It is a further object of the present invention to provide a novel and improved rotary shaft control means designed to provide 360° rotation of the shaft.

It is another object of the present invention to provide a wheel steering and damping mechanism utilizing a rack to transmit the steering and damping forces, and a gear rigidly connected with the wheel.

It is a still further object of the present invention to provide novel means for eliminating backlash in a steering and damping assembly.

Another object of the invention is to provide a novel fluid system for controlling actuation of a cylinder and piston assembly or the like.

Other objects, features and advantages of the present invention will be more fully apparent from the following detailed description taken in connection with the accompanying drawings, in which.

As shown on the drawings.

Figure 1:
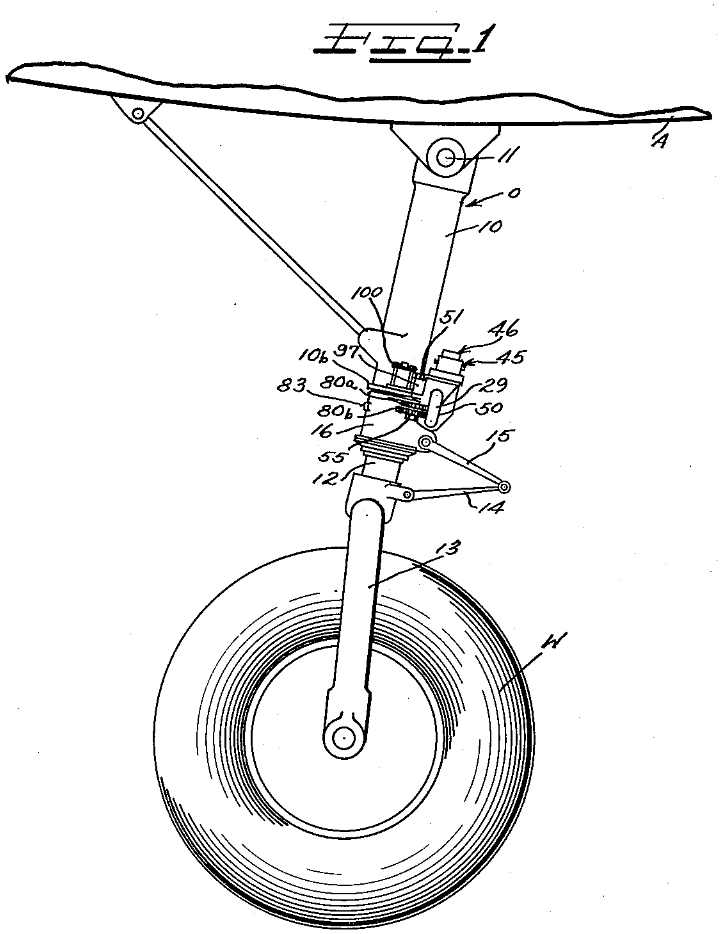
FIGURE 1 is a fragmentary side elevational view of a steering wheel supporting structure and its connection with an airplane, and showing the control mechanism of the present invention applied thereto.

Referring to FIGURE 1, A indicates the body structure of an airplane from which extends an oleo strut O comprising a member 10 hinged to the airplane body as indicated at 11 and an element 12 which terminates in a fork 13 journaling the wheel W to be controlled. The oleo strut is well known in the art, the member 10 containing spring means or hydraulic fluid flow resistance means for dampening movement of the element 12 to absorb the shock of vertical movement of the wheel W. Links 14 and 15 are hinged together at their outer ends and have their inner ends connected, respectively, to the fork 13 and to a ring 16 journaled on the member 10.

Figure 3:
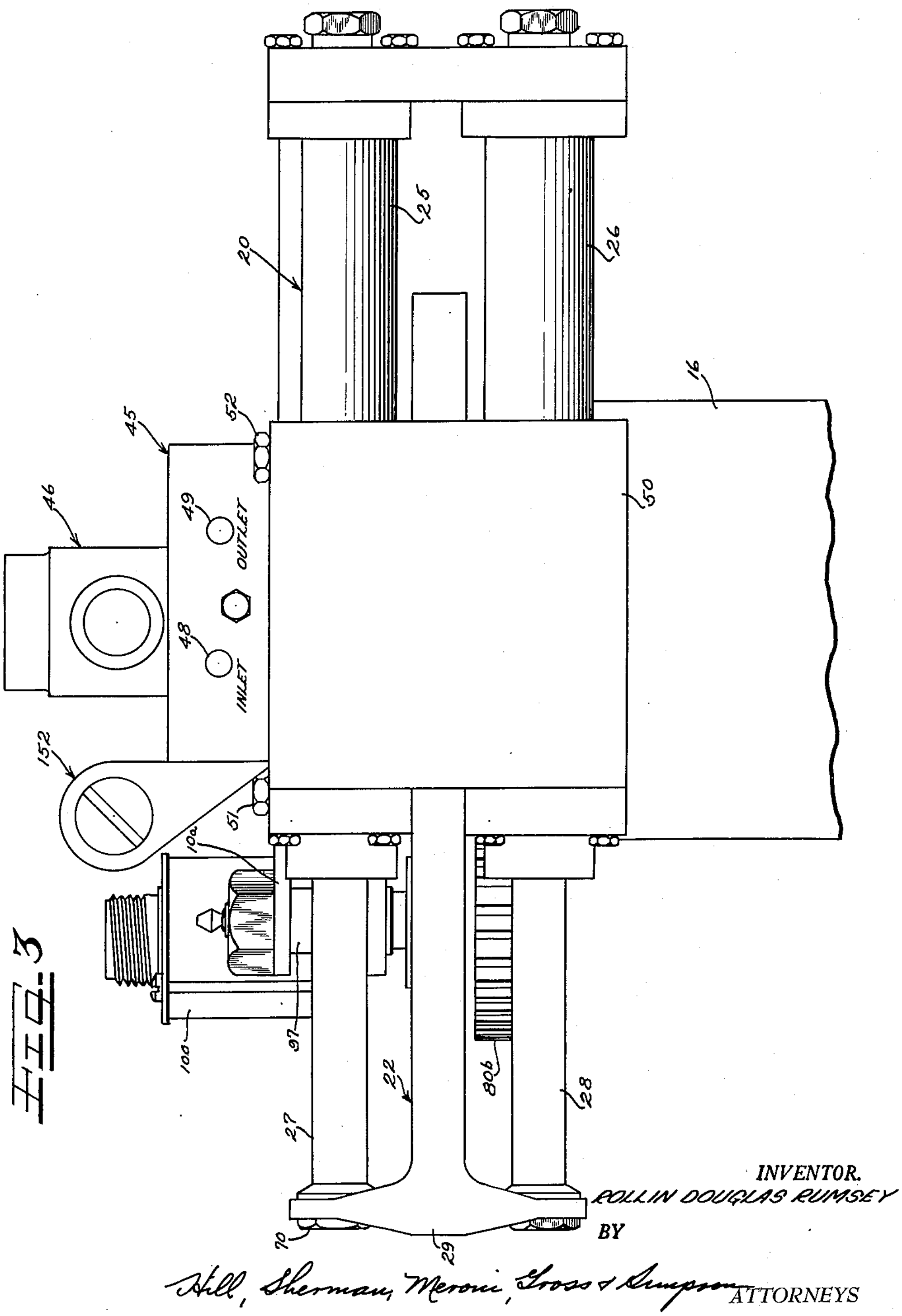
FIGURE 3 is a fragmentary elevational view taken generally at right angles to the showing of FIGURE 2.
Figure 4:
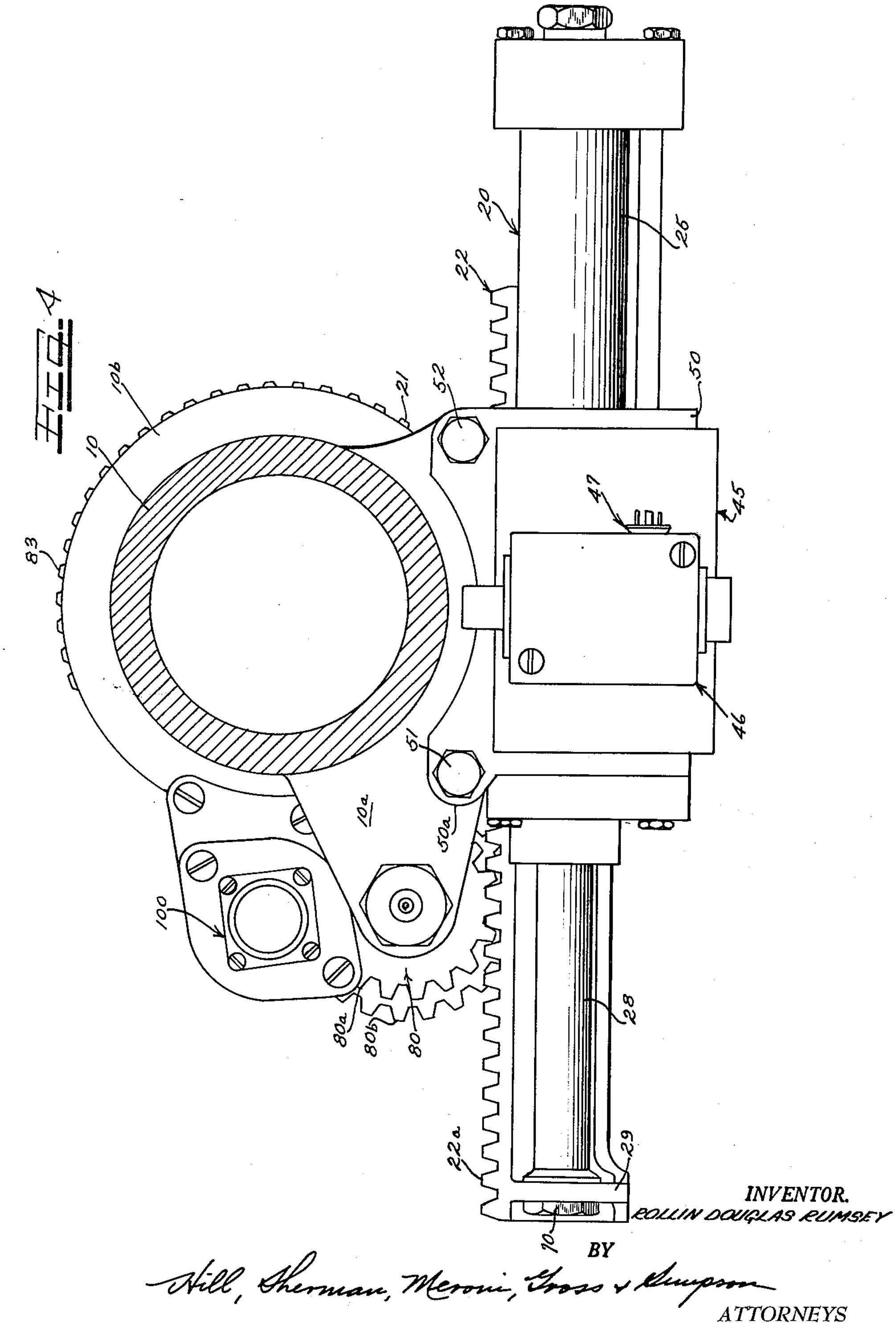
FIGURE 4 is a horizontal sectional view and illustrating the control mechanism of the present invention in top plan.
Figure 6:
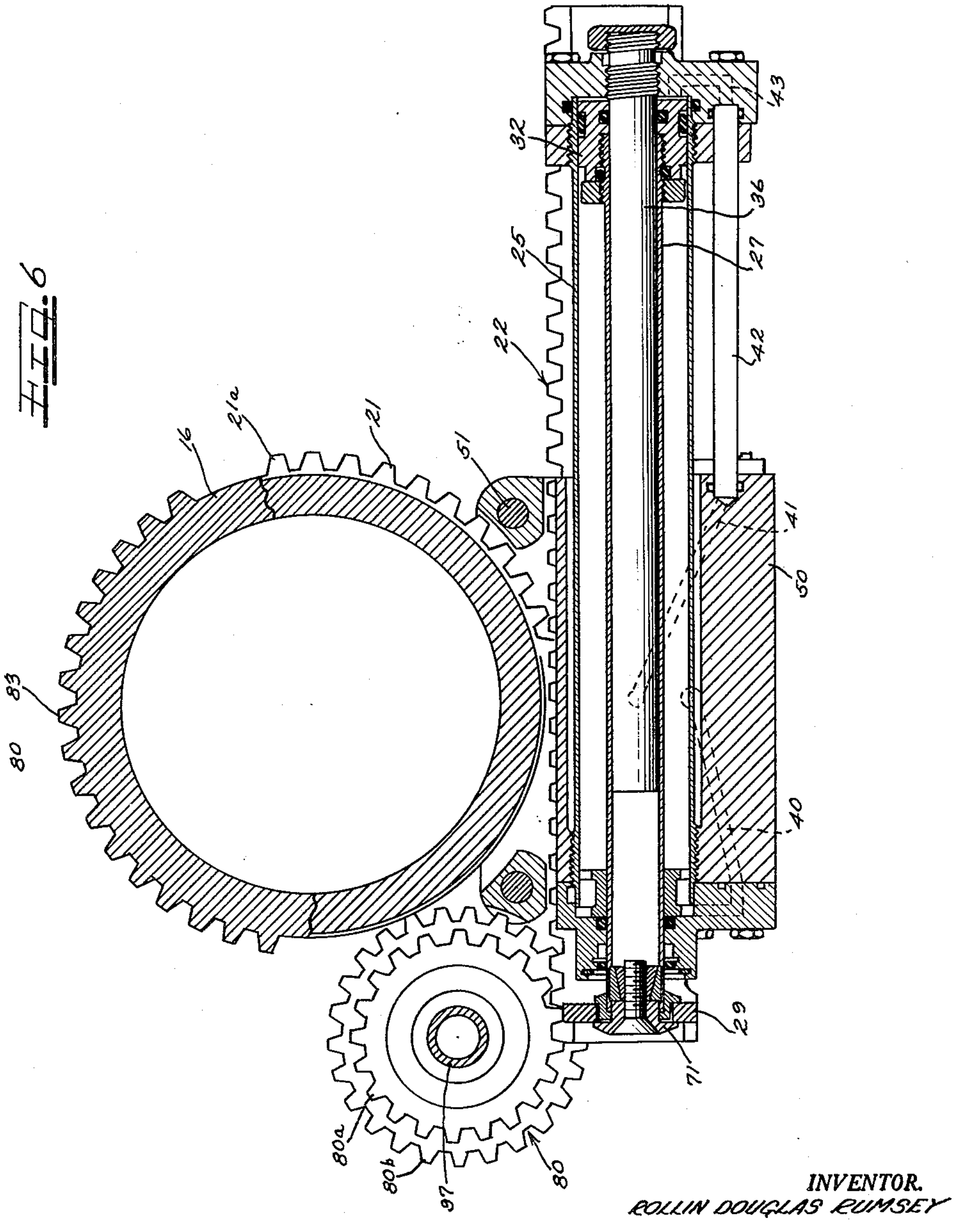
FIGURE 6 is a horizontal sectional view illustrating the mechanism at one extreme of its control range.

For controlling rotary movement of the element 12 and ring 16, a piston assembly 20 seen in FIGURE 3 is coupled to the ring 16 by means of a gear segment 21, FIGURE 4, on the ring which meshes with a linearly reciprocating rack member 22. Specifically as illustrated in FIGURE 3, there are two cylinder members 25 and 26 having respective piston rods 27 and 28 connected to a cross head 29 carried by the rack 22. Each of the piston rods such as 27 carries a piston member such as 32 in FIGURE 6 slidable in the cylinder and dividing the interior of the cylinder into two working chambers. As seen in FIGURE 6 a suitable guide rod 35 may be provided within the piston rod 27 so as to maintain the working chambers of substantially equal cross section. Suitable connecting passages such as indicated at 40, 41, 42 and 43 may be provided for connecting the respective working chambers with a valve mechanism which may be located as indicated by the reference numeral 45. The valve mechanism 45 may have suitable inlet and outlet connections as indicated at 48 and 49 in FIGURE 3 for attachment to hoses leading from a source of fluid under pressure carried within the body of the aircraft. Suitable electrically operated control valve means may be located as indicated by the reference numeral 46 in FIGURES 1 and 4 for controlling the supply of fluid under pressure from the inlet 48 of the valve mechanism 45 to the cylinders 25 and 26 to steer the wheel. In the illustrated embodiment, electric control power may be supplied to the mechanism 46 by means of a suitable plug connector such as indicated at 47 in FIGURE 4.

It will be readily understood that during the damping mode, circulation between the working chambers on the respective sides of the piston members 32 is retarded by the valve mechanism 45 in such a manner as to afford a predetermined resistance to turning of the collar 16 in either direction from a central or neutal position. In the steering mode, fluid under pressure is supplied to one working chamber of each cylinder from inlet 48 so as to turn the sleeve 16 and wheel W in the desired direction through extension or retraction of the pistons 27 and 28.

Figure 2:
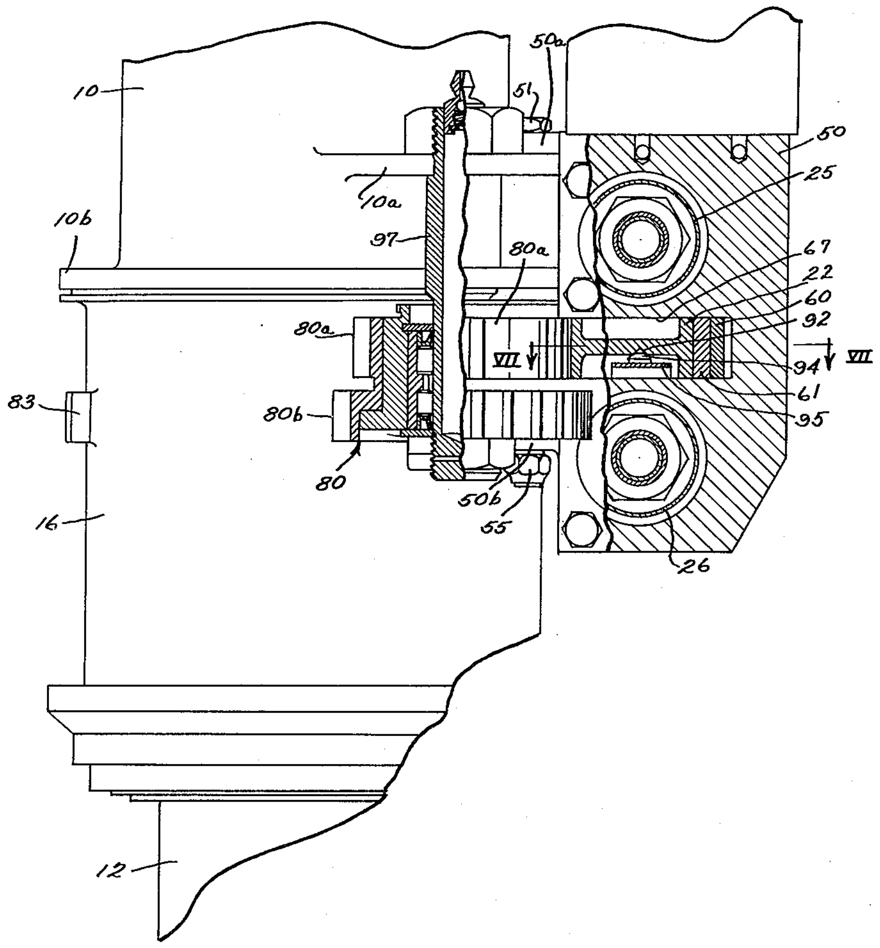
FIGURE 2 is a fragmentary enlarged side elevational view of the control mechanism of the present invention with certain parts broken away and in section.

As illustrated in FIGURES 2 and 4, the strut 10 has flange means 10*a* to which the ratchet supporting bracket 50 is attached by means of bolts 51 and 52. As seen in FIGURE 2, the bolts such as 51 extend through flange means 50*a* on the bracket 50 and through flange means 10*b* on the strut 10 and through fittings 50*b* on the bracket 50 and have nuts 55 at the lower end thereof.

Figure 7:
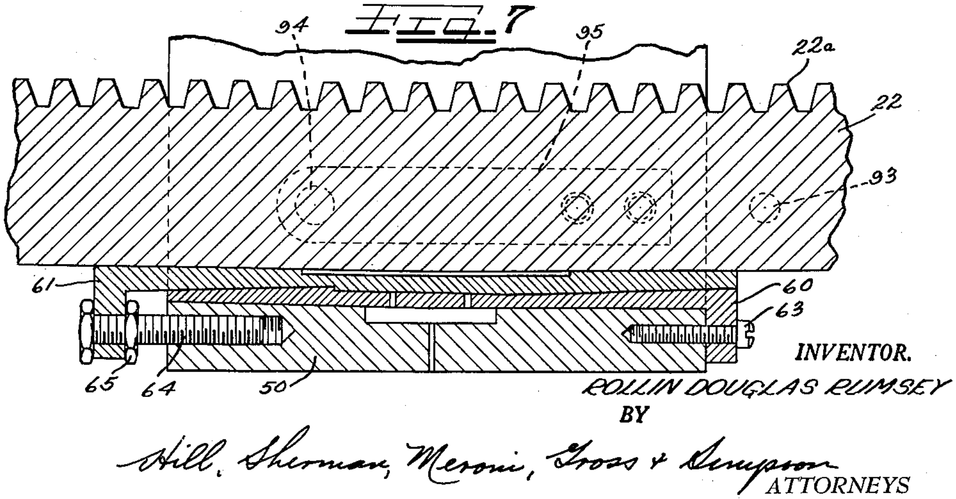
FIGURE 7 is a fragmentary enlarged horizontal sectional view showing the manner of eliminating backlash between the rack and gear section.
Figure 5:
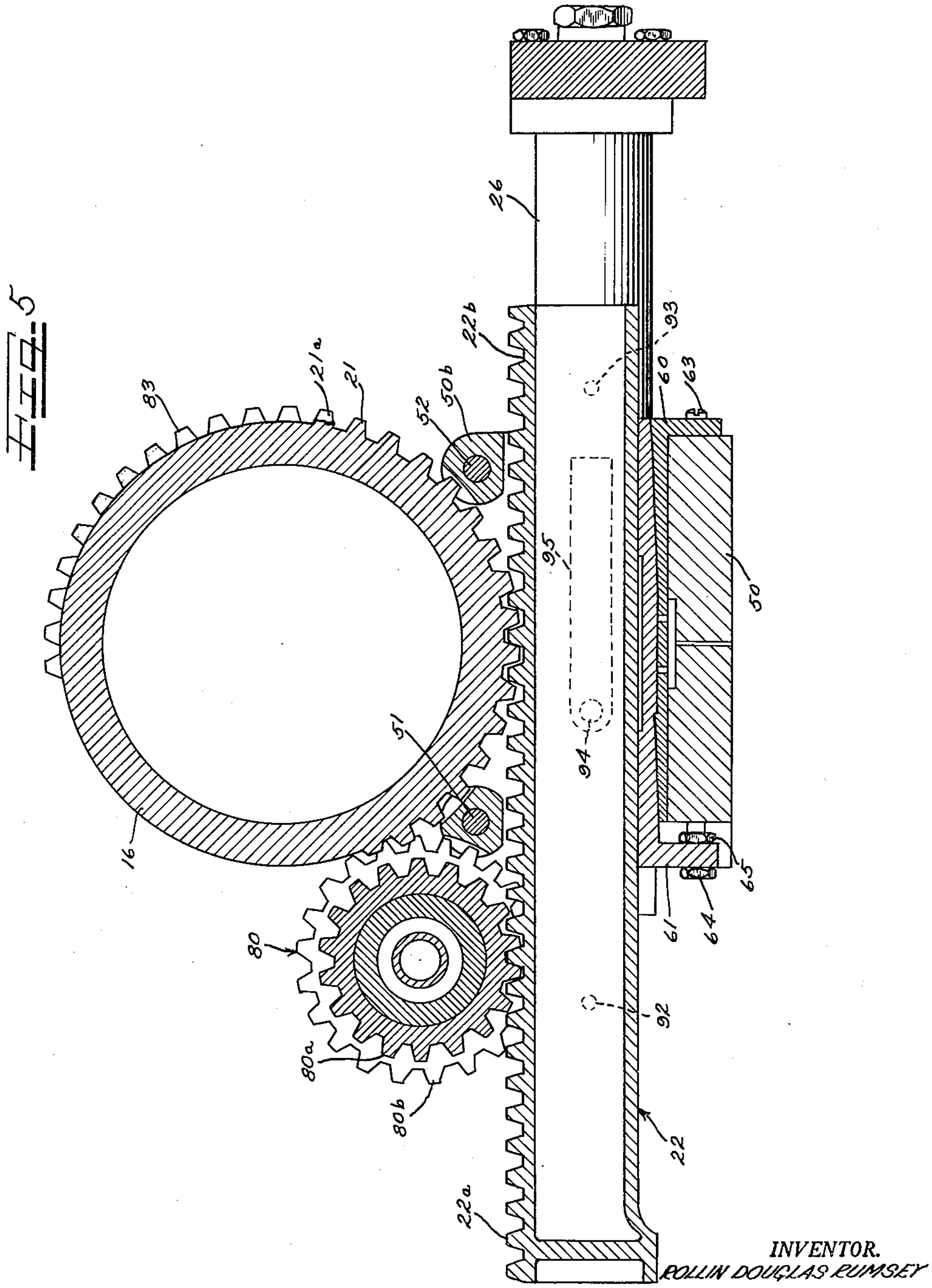
FIGURE 5 is a horizontal sectional view illustrating the mechanism in neutral position.

For eliminating backlash, the bracket 50 has a pair of wedge members 60 and 61, FIGURES 5 and 7, adapted to operate to force the rack member 22 into tight engagement with the teeth 21 on the ring 16. The wedge member 60 is fixed to the bracket 50 by means of a screw 63, and the wedge member 61 is adjustable by means of a screw 64 having a nut 65 cooperating to position the wedge member 61. The rack 22 is adapted to move in a channel 67, FIGURE 2, provided by the bracket 50 with the wedge member 61 adapted to urge the rack 22 laterally of the channel 67 toward the center line of the strut 10. Adjustment to eliminate backlash is made by loosening the bolts 70 and 71, FIGURES 3 and 6, on the ends of the piston rods 27 and 28 and adjusting the rack to zero backlash in the center position and then retightening the piston rod bolts 70 and 71 with the rods 27 and 28 fully entered into the respective cylinders 25 and 26. This will assure near perfect alignment throughout the stroke with minimum bearing loads and zero backlash. The illustrated gear-rack configuration reduces the possible source of backlash to just one joint which can be adequately controlled as described above. It was found that configurations employing links and pivots were unsuitable for certain applications because of the need for extreme rigidity.

For allowing 360° swiveling of the wheel W, the rack 22 is provided with a return mechanism including a gear 80 carried by the flange means 10*a* and including upper teeth 80*a* in mesh with the rack teeth 22*a* and lower gear teeth 80*b* for meshing with the teeth 83 on the ring 16 during the time when the wheel is out of its controlled range.

FIGURE 5 illustrates the ring 16 in its central position. Angular movements for 73° in either direction from the central position of the ring 16 and wheel W is damped through the rack 22 and pistons 27 and 28. In steering mode, cylinders 25 and 26 are operative to rotate the ring 16 for 73° in either direction from the central position shown in FIGURE 5. During this operative control range of 146°, the gear 80*a* is in mesh with the rack 22 but the gear 80*b* is not in mesh with the teeth 83 on collar 16.

FIGURE 6 illustrates the wheel at one extreme of its controlled range with the rack 22 at its extreme right hand position. Upon continued turning of the ring 16 beyond its controlled range, the rack return teeth 83 come into mesh with the gear 80*b* to turn the gears 80*b* and 80*a* in the clockwise direction and to shift the rack 22 to the left. Thus, if the ring 16 continues to swivel in the counterclockwise direction as seen in FIGURE 6, the leading tooth 21*a* will come into mesh with the rack 22 at the valley 22*b* shown in FIGURE 5, after which continued rotation of the ring 16 in the counterclockwise direction will begin to move the rack 22 to the right toward the central position shown in FIGURE 5. For maintaining the rack in its extreme positions, the rack is provided with a pair of detent sockets 92 and 93, FIGURE 5, cooperating with a spring urged detent 94 carried on a leaf spring 95 as seen in FIGURES 2 and 5. The detent 94 is shown in engagement with the socket 92 in FIGURE 2 for illustrative purposes even though the ring 16 is not shown in the corresponding angular position, but is shown in the angular position of FIGURE 5.

As illustrated in FIGURE 2, the gears 80 may be mounted by means of a vertical shaft 97 extending through the flange means 10*a* and the flange 10*b* of the strut 10.

Figure 8:
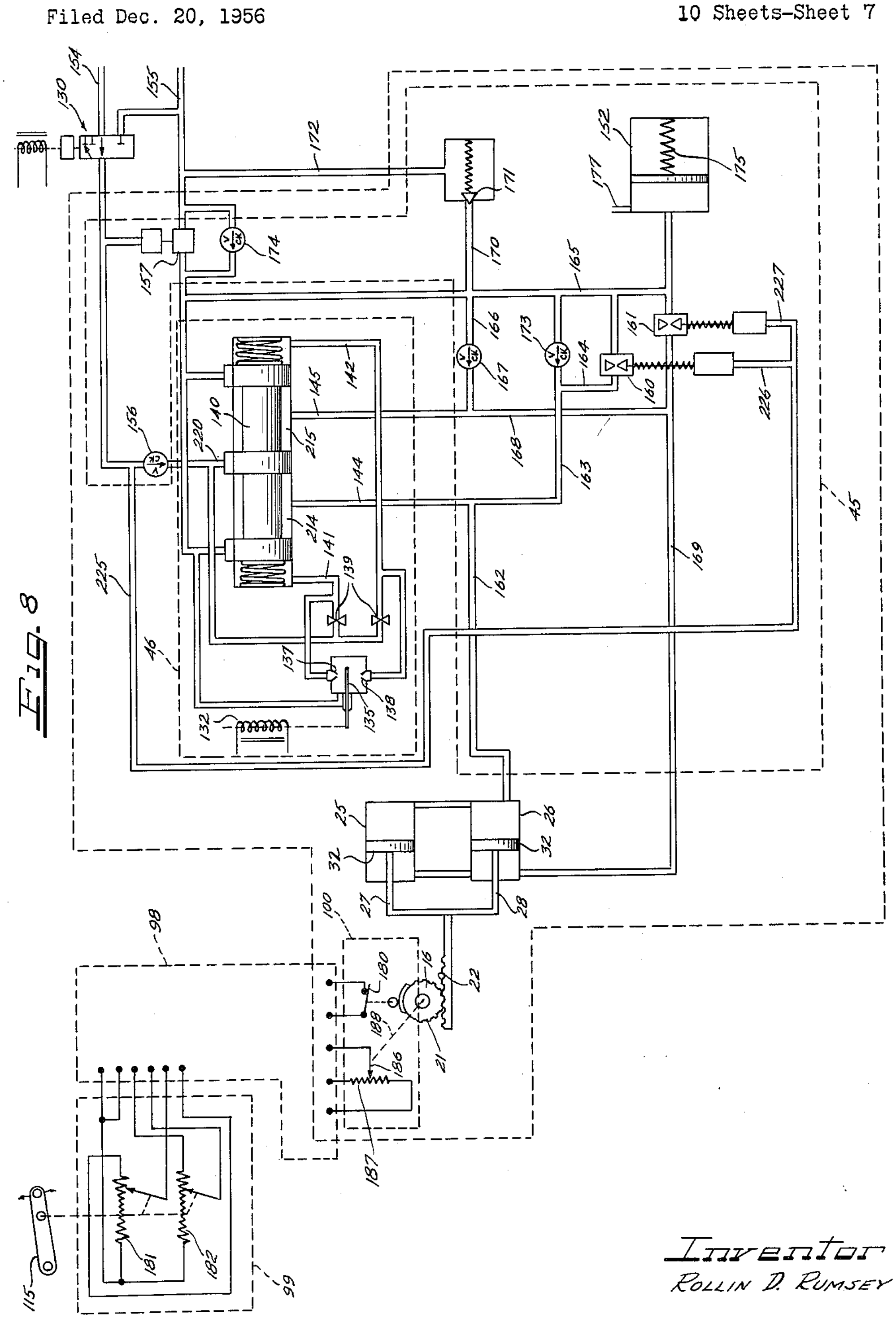
FIGURE 8 is a diagrammatic illustration of the electric and hydraulic control system for the mechanism of FIGURES 1 to 7.

Referring to FIGURE 8, the hydraulic actuator cylinders 25 and 26 may be utilized in conjunction with the control valve unit 46, a magnetic amplifier 98, and rudder pedal and nose wheel position transducers 99 and 100 to control steering as a function of the error in position between a rudder bar bell crank 115 coupled to transducer 99 and the wheel W which is coupled to transducer 100.

In the steering mode, steering operation is accomplished by the pilot turning on the steering power switch (not shown) and moving the rudder bar until it coincides with the nose wheel position. When agreement is reached between the rudder pedal position transmitter 99 and the nose wheel position transmitter 100, a relay (not shown) in the magnetic amplifier locks closed. This relay causes energization of three way solenoid valve 130 which then applies hydraulic pressure to the steering unit. When the pilot introduces an error signal by moving the rudder control, the error voltage is amplified by the magnetic amplifier 98 and applied to coil 132 of the control valve 46. Energization of coil 132 moves a flapper valve member 135 differentially between two metering nozzles 137 and 138. As the flapper valve member 135 approaches one nozzle it sets up a restriction resulting in a build up of pressure on that nozzle and a corresponding reduction on the other. This differential pressure which builds up downstream of metering orifices 139 is applied by passages 141 and 142 to the ends of the main valve spool 140 causing it to move a fixed distance which is a function of the spool centering spring rate. Thus, a definite primary flow rate to the cylinders 25 and 26 is established that is directly proportional to the error signal introduced by the pilot up to the maximum capability of the valve.

The two output passages 144 and 145 of the servo valve 46 connect directly to the respective sides of the pistons 32 in cylinders 25 and 26. The introduction of differential hydraulic pressure to the actuating cylinders 25 and 26 shifts pistons 32 and thus rotates the nose wheel until the error signal is reduced to zero.

In the damping mode, a reservoir accumulator 152 is provided to absorb any slight differential displacement which may exist between the two working chambers of the cylinders. This insures shimmy protection in the event of complete hydraulic failure in the aircraft. When the steering power is off, the solenoid three way valve 130 closes, removing hydraulic supply pressure and connecting supply line 154 to the return line 155. This permits the inlet check valve 156 and pilot operated outlet valve 157 to close and the servo valve spool 140 to spring center itself thus closing off all its passages. Removing steering pressure removes the closing force from two pilot operated damping orifice valves 160 and 161 thus allowing them to open. These damping orifice valves are individually adjustable and incorporate pressure relief springs in order to limit damping torques to safe values in the event of cross wind landings. As the pistons 27 and 28 are forced into the cylinders 25 and 26 during damping, a flow proceeds from the head end of the cylinders through lines 162, 163 and 164, the damping orifice valve 160 and back into the rod end of the cylinders through lines 165, 166, replenishing valve 167, and lines 168 and 169. The surplus flow enters the accumulator 152 until it is fully charged when any excess will flow out through line 170, relief valve 171 and line 172 to the return line 155. On the reverse stroke, fluid flows from the rod end of the cylinders through the other damping orifice 161 and the other replenishing valve 173 to the head end of the cylinders. The flow shortage is made up by the fluid in the accumulator 152 if low return line pressure exists or directly from the return line 155 through the return line check valve 174 if the return line pressure is higher than that produced by the accumulator spring 175.

The accumulator capacity is sufficient to take care of the differential flow for a full seven inch piston stroke or 160° rotation on the strut. The normal replenishing and air bleeding occurs on every stroke, at 177 on the accumulator 152. Thermal expansion or contraction of the fluid within the unit is taken care of by means of the outlet check valve 174 and pressure relief valve 171.

Inasmuch as the steering is limited to 73° on each side of a center position, a limit switch 180 may be provided in the nose wheel position transmitter housing to turn off the electrical system and restore the system to the damping mode when the wheel W is outside of the steering range.

Non-linearity if desired may be provided by using a non-linear winding in the rudder pedal position transmitter potentiometer assembly 99. Two such windings 181 and 182 with suitable external switching (not shown) provide dual range control. This method of producing non-linearity has the advantage of simplicity, although the same potentiometer with one to three taps and loaded with padding resistors could be utilized to achieve the same results. The wheel position transmitter is shown on the wheel assembly in FIGURES 1 and 4 and is designated generally by the reference numeral 100. The sliding arm 186 of potentiometer 187 may be coupled to ring 16 in any suitable manner as indicator by the dash line 188 in FIGURE 8.

A specific embodiment of the valve block diagrammatically indicated at 45 in FIGURE 8 is shown in detail in FIGURES 9 through 14. Corresponding reference numerals will be given to corresponding parts where possible to facilitate understanding FIGURES 9 to 14. It will be seen in FIGURE 3 that the valve block 45 is disposed below the servo valve assembly 46 shown diagrammatically in FIGURE 8. FIGURE 6 illustrates schematically passages 40 and 41 leading from respective opposite ends of the cylinders; these passages extend upwardly in the bracket structure 50 to connect with vertical passages 210 and 211, respectively, of the valve block 45. Passages 210 and 211 extend entirely through the valve block and communicate directly with vertically aligned passages in the bottom face of the servo valve assembly 46 corresponding to some extent to passages 145 and 144, respectively, shown diagrammatically in FIGURE 8.

Inlet and outlet passages 48 and 49 of the valve block 45, which have been described in connection with FIGURE 3, are shown in detail in FIGURE 12. From inlet 48, fluid flows through check valve 156 to chamber 215 and from thence through a passage indicated at 217, FIGURES 10 and 12, to the vertical inlet pressure passage 218, FIGURE 10, which communicates at the upper face of valve block 45 with the inlet passage of the servo valve assembly generally corresponding to line 220 in FIGURE 8. The inlet passages 48 is also referenced to damping orifice valves 160 and 161 by means of passages 222 and 223, FIGURES 10 and 12, corresponding generally to passages 225, 226 and 227 in FIGURE 8. Application of inlet pressure to control chambers such as 230 in FIGURE 12 of the damping orifice valves moves the damping valve members such as 232 to closed position to cut off communication between vertical passages 210 and 211 which lead to the respective working chambers of cylinders 25 and 26. A passagesway 235 is shown in FIGURE 10 which extends between vertical passage 211 and chamber 236 of damping orifice valve 160. A corresponding passage 237, FIGURE 10, extends from vertical passage 210 to chamber 238 of damping orifice valve 161. Passage 240, FIGURES 11 and 12, and passage 241, FIGURE 9, lead from chambers 242 and 243 of the damping orifice valves to a horizontal passageway 245, which in turn intersects with a vertical passage 247 corresponding to some extent with line 165 in FIGURE 8.

Figure 9:
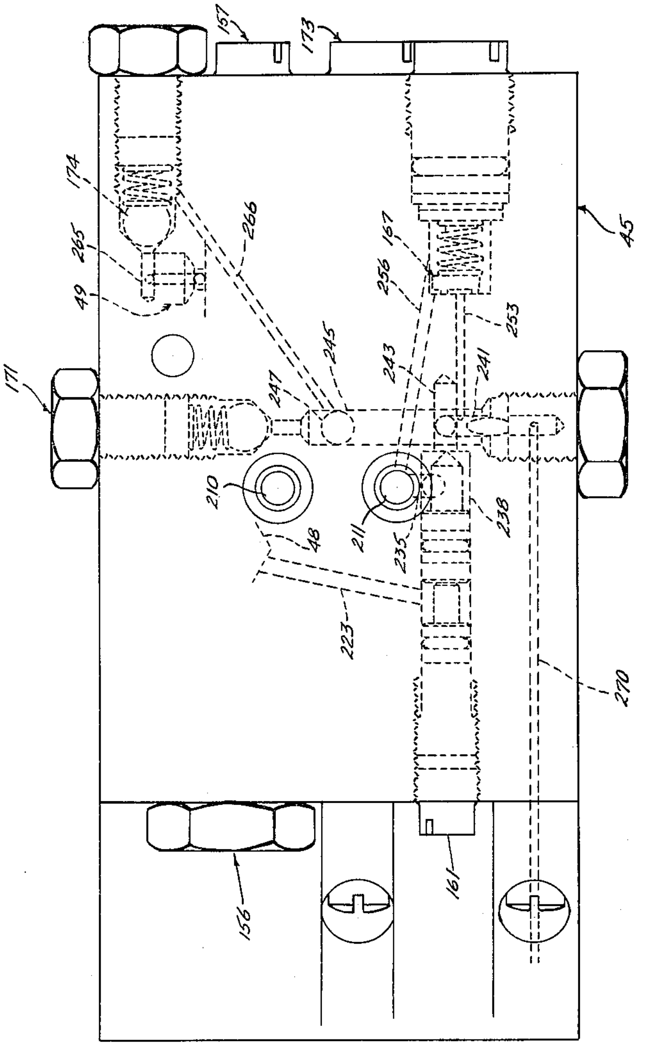
FIGURE 9 is a bottom plan view of the valve block assembly shown in FIGURE 3.
Figure 14:
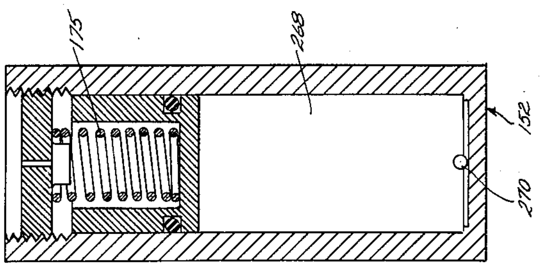
FIGURE 14 is a longitudinal sectional view of the accumulator of the valve block assembly of FIGURE 9.
Figure 11:
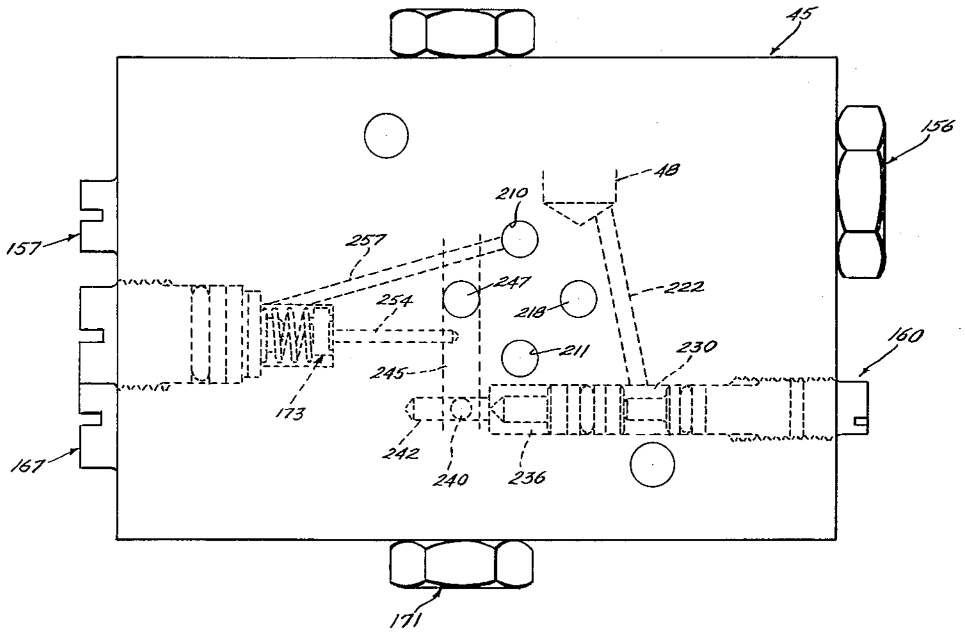
FIGURE 11 is a top plan view of the valve block of FIGURE 9.
Figure 10:
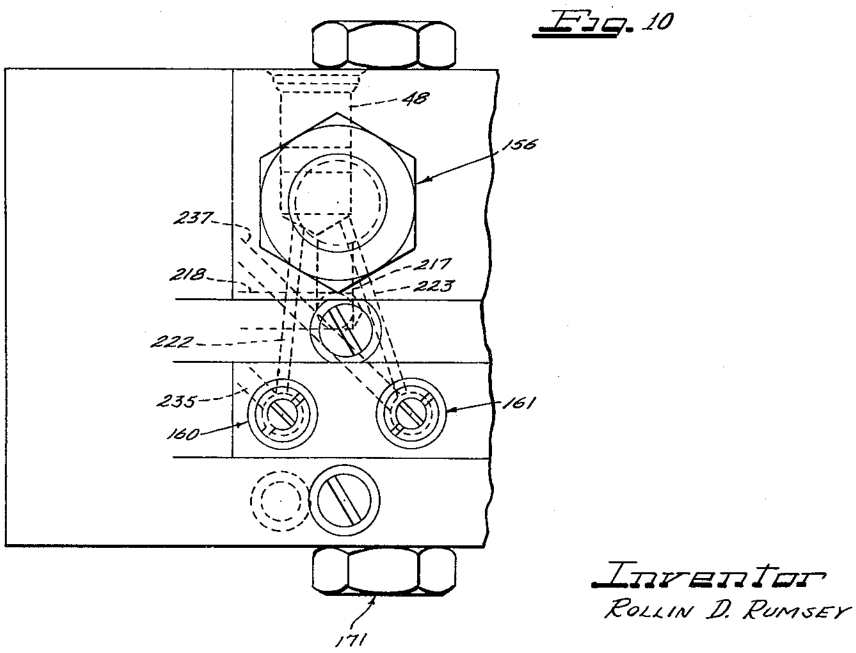
FIGURE 10 is a fragmentary end elevational view of the valve block assembly of FIGURE 9.
Figure 12:
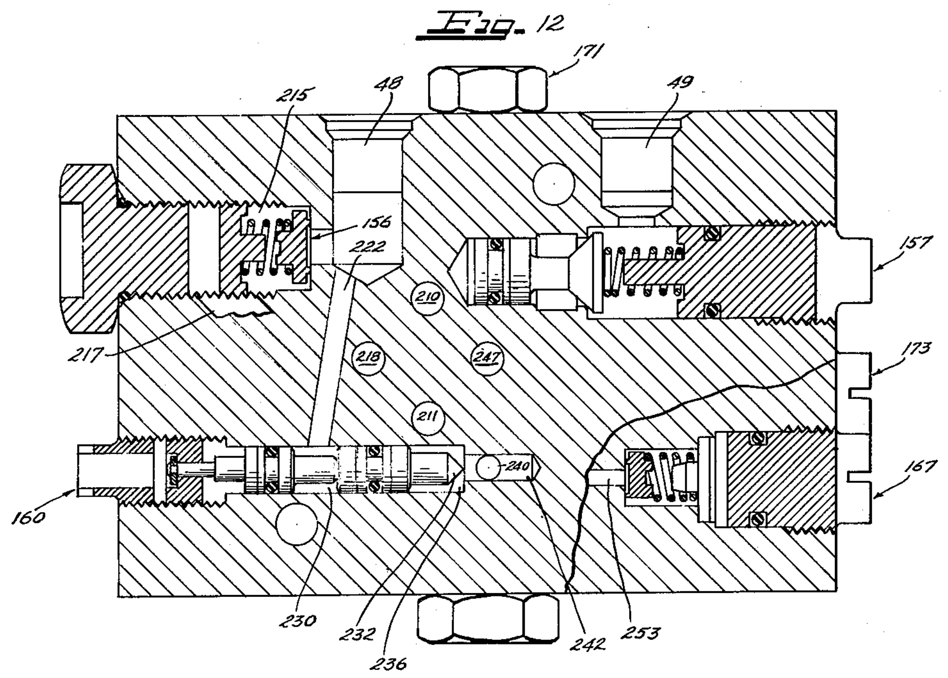
FIGURE 12 is a fragmentary horizontal sectional view looking from the bottom of the valve block of FIGURE 9.
Figure 13:
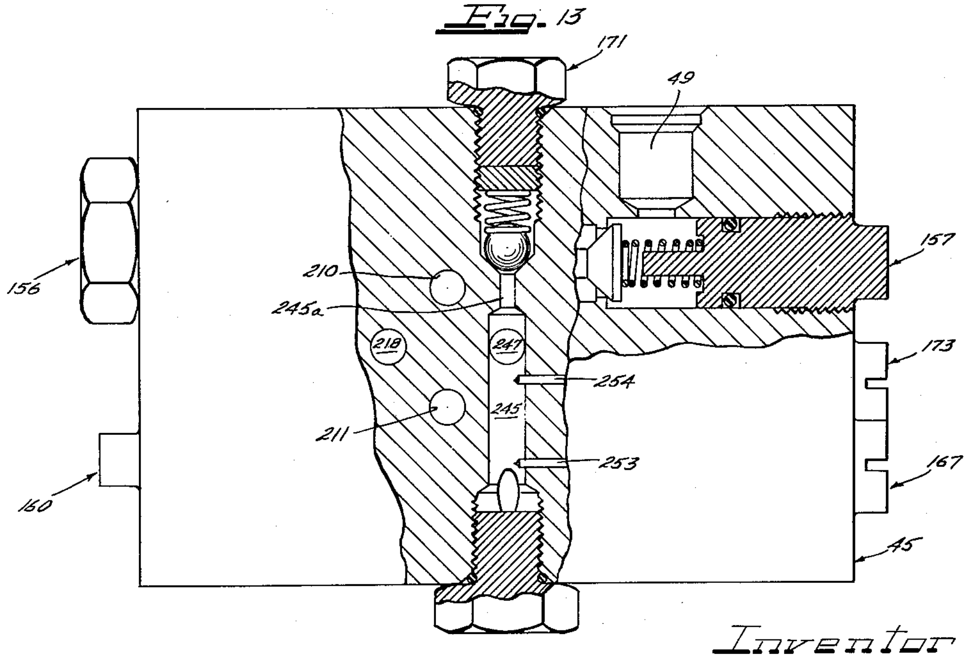
FIGURE 13 is a further fragmentary horizontal sectional view of the valve block of FIGURE 9, looking from the bottom.

Replenishing check valve 167, FIGURE 9, and 173, FIGURE 11, communicate at their upstream sides with passages 253 and 254 leading to horizontal passage 245, and communicate at their downstream sides with passages 211 and 210, respectively by means of passages 256 and 257. Pressure relief valve 171, FIGURE 13, communicates with the horizontal passage 245 by means of reduced cross section passage 245*a* thereof. Replenishing check valve 174, FIGURE 9, communicates with the outlet 49 by means of passage 265 and communicates with vertical passage 247 by means of passage 266. Chamber 268 of accumulator 152, FIGURE 14, communicates with horizontal passage 245, FIGURE 9, by means of passage 270, FIGURES 9 and 14.

The manner in which the valve block assembly 45 operates in conjunction with servo valve assembly 46 and cylinders 25 and 26 will be apparent from the description of FIGURE 8, wherein corresponding parts have the same reference numerals.

It will be apparent that many modifications and variations may be effected without departing from the scope of the novel concepts of the present invention.

I claim as my invention:

1. A control assembly comprising mounting means for carrying an element to be controlled, fluid operated control means supported with said mounting means and having actuating means for controlling movement of said element and having fluid chambers for controlling movement of said actuating means, flow control mechanism supported in abutting relation to said fluid operated control means at the exterior thereof for controlling fluid flow between said fluid chambers, and remotely controlled valve means supported in abutting relation to said flow control mechanism for controlling supply of fluid pressure selectively to said fluid chambers, said flow control mechanism comprising a unitary block having damping and replenishing valve means mounted therein and having a pair of straight fluid passages communicating at one end with the respective fluid chambers of said fluid operated control means and at the other end with said fluid valve means to transmit fluid pressure to the chambers in the steering mode of operation, and said block having further passages interconnecting said straight fluid passages with said damping and replenishing valve means.

2. A control assembly comprising mounting means for carrying an element to be controlled, fluid operated control means supported with said mounting means and having actuating means for controlling movement of said element and having fluid chambers for controlling movement of said actuating means, flow control mechanism supported in abutting relation to said fluid operated control means at the exterior thereof for controlling fluid flow between said fluid chambers, and remotely controlled valve means supported in abutting relation to said flow control mechanism for controlling supply of fluid pressure selectively to said fluid chambers, said flow control mechanism comprising a unitary block having damping and replenishing valve means mounted therein and having a pair of straight fluid passages communicating at one end with the respective fluid chambers of said fluid operated control means and at the other end with said fluid valve means to transmit fluid pressure to the chambers in the steering mode of operation, and said block having further passages interconnecting said straight fluid passages with said damping and replenishing valve means, and having means for shifting said damping valve means to closed position to shut off communication between said straight fluid passages in said steering mode of operation.

3. A control assembly comprising mounting means for carrying an element to be controlled, fluid operated control means supported with said mounting means and having actuating means for controlling movement of said element and having fluid chambers for controlling movement of said actuating means, flow control mechanism supported in abutting relation to said fluid operated means at the exterior thereof for controlling fluid flow between said fluid chambers, and remotely controlled valve means supported in abutting relation to said flow control mechanism for controlling supply of fluid pressure selectively to said fluid chambers, said flow control mechanism comprising a unitary block having damping and replenishing valve means mounted therein and having a pair of straight fluid passages communicating at one end with the respective fluid chambers of said fluid operated control means and at the other end with said fluid valve means to transmit fluid pressure to the chambers in the steering mode of operation, and said block having further passages interconnecting said straight fluid passages with said damping and replenishing valve means and having accumulator means mounted in abutting relation thereto for supplying a constant fluid pressure head in communication with said replenishing valve means.

4. In combination, a support member, a wheel carrying element swivelly mounted on said support member, a torque transmitting collar rotatably mounted on said support member and coupled to said wheel carrying element for conjoint movement therewith, said collar having a series of gear teeth thereon, a rack having a linear series of gear teeth meshing with the gear teeth on the collar, a bracket secured to said support member and having means for guiding said rack for linear reciprocation, cylinder and piston means carried by said bracket and connected between said bracket and said rack and having oppositely disposed fluid chambers to control movement of the rack in respective opposite directions, a valve block mounted on said bracket and having a pair of straight fluid passages extending therethrough and opening at one side adjacent said bracket and at an opposite side remote from said bracket, said bracket having a pair of fluid passages communicating at one end with the respective fluid chambers of the cylinder and piston means and at the opposite end directly with the respective straight fluid passages in said valve block, and remotely controlled valve means mounted on said opposite side of said valve block and having fluid pressure outlet passages communicating directly with the respective straight fluid passages in said valve block, said remotely controlled valve means being operative to selectively supply fluid pressure to the respective straight fluid passages to move said rack in respective opposite directions.

5. In combination, a support member, a wheel carrying element swivelly mounted on said support member, a torque transmitting collar rotatably mounted on said support member and coupled to said wheel carrying element for conjoint movement therewith, said collar having a series of gear teeth thereon, a rack having a linear series of gear teeth meshing with the gear teeth on the collar, a bracket secured to said support member and having means for guiding said rack for linear reciprocation, cylinder and piston means carried by said bracket and connected between said bracket and said rack and having oppositely disposed fluid chambers to control movement of the rack in respective opposite directions, a valve block mounted on said bracket and having a pair of straight fluid passages extending therethrough and opening at one side adjacent said bracket and at an opposite side remote from said bracket, said bracket having a pair of fluid passages communicating at one end with the respective fluid chambers of the cylinder and piston means and at the opposite end directly with the respective straight fluid passages in said valve block, and remotely controlled valve means mounted on said opposite side of said valve block and having fluid pressure outlet passages communicating directly with the respective straight fluid passages in said valve block, said remotely controlled valve means being operative to selectively supply fluid pressure to the respective straight fluid passages to move said rack in respective opposite directions, said remotely controlled valve means being operative to substantially close said fluid pressure outlet passages in a neutral condition thereof, said valve block having means controlling fluid communication between said straight fluid passages in neutral condition of said remotely controlled valve means to damp movement of said rack and being operative to close off fluid communication between said straight fluid passages while rack movements are under the control of said remotely controlled valve means.

References Cited in the file of this patent

UNITED STATES PATENTS

| | | |
|---|---|---|
| 2,654,347 | Clark | Oct. 6, 1953 |
| 2,712,422 | Gerwig | July 5, 1955 |
| 2,761,254 | Jameson | Sept. 4, 1956 |
| 2,793,500 | Kulick | May 28, 1957 |
| 2,800,143 | Keller | July 23, 1957 |
| 2,843,864 | Haas | July 22, 1958 |